US009959265B1

(12) United States Patent
Vagell et al.

(10) Patent No.: US 9,959,265 B1
(45) Date of Patent: May 1, 2018

(54) POPULATING VALUES IN A SPREADSHEET USING SEMANTIC CUES

(71) Applicant: Google Inc., Mountain View, CA (US)

(72) Inventors: Vance Julius Vagell, Kew Gardens, NY (US); Colleen O'Banion, Brooklyn, NY (US)

(73) Assignee: GOOGLE LLC, Mountain View, CA (US)

(*) Notice: Subject to any disclaimer, the term of this patent is extended or adjusted under 35 U.S.C. 154(b) by 690 days.

(21) Appl. No.: 14/273,016

(22) Filed: May 8, 2014

(51) Int. Cl.
G06F 17/24 (2006.01)
G06F 17/30 (2006.01)

(52) U.S. Cl.
CPC ...... G06F 17/245 (2013.01); G06F 17/30657 (2013.01)

(58) Field of Classification Search
CPC .. G06F 17/243; G06F 17/246; G06F 3/04842; G06F 3/04845
See application file for complete search history.

(56) References Cited

U.S. PATENT DOCUMENTS

| 5,307,484 | A | 4/1994 | Baker et al. |
| 5,345,516 | A | 9/1994 | Boyer et al. |
| 5,416,895 | A | 5/1995 | Anderson et al. |
| 5,600,584 | A | 2/1997 | Schlafly |
| 5,603,021 | A | 2/1997 | Spencer et al. |
| 5,706,449 | A | 1/1998 | Liu et al. |
| 5,809,317 | A | 9/1998 | Kogan et al. |
| 5,842,180 | A | 11/1998 | Khanna et al. |
| 5,910,802 | A | 6/1999 | Shields et al. |
| 5,950,168 | A | 9/1999 | Simborg et al. |
| 6,055,550 | A | 4/2000 | Wallack |
| 6,204,846 | B1 | 3/2001 | Little et al. |
| 6,205,453 | B1 | 3/2001 | Tucker et al. |
| 6,317,758 | B1 | 11/2001 | Madsen et al. |
| 6,430,574 | B1 | 8/2002 | Stead |
| 6,437,812 | B1 | 8/2002 | Giles et al. |
| 6,711,715 | B1 | 3/2004 | Grealish |

(Continued)

FOREIGN PATENT DOCUMENTS

| EP | 1054329 A2 | 11/2000 | |
| WO | WO0159675 | * 1/2002 | ............ G06F 15/16 |
| WO | 2012087418 A1 | 6/2012 | |

OTHER PUBLICATIONS

Abraham et al., "How to Communicate Unit Error Message in Spreadsheets" First Workshop on End User Software Engineering, May 21, 2005, St. Louis, Missouri, p. 1-5.

(Continued)

*Primary Examiner* — Scott Baderman
*Assistant Examiner* — Mario M Velez-Lopez
(74) *Attorney, Agent, or Firm* — Young Basile Hanlon & MacFarlane, P.C.

(57) ABSTRACT

A method includes obtaining at least one query value from a table having a plurality of cells; executing a search function using the at least one query value to identify at least a first data set that is potentially relevant to the at least one query value; and outputting, for display, a first interface area that includes information from the first data set. In response to selection of the first interface area, the method includes populating a first cell from the plurality of cells with a first data value from the first data set.

18 Claims, 7 Drawing Sheets

(56) References Cited

U.S. PATENT DOCUMENTS

| | | |
|---|---|---|
| 6,734,883 B1 | 5/2004 | Wynn et al. |
| 6,738,084 B1 | 5/2004 | Kelley et al. |
| 6,751,603 B1 | 6/2004 | Bauer et al. |
| 6,778,192 B2 | 8/2004 | Arbab et al. |
| 6,828,988 B2 | 12/2004 | Hudson et al. |
| 6,978,443 B2 | 12/2005 | Flanagan et al. |
| 6,988,241 B1 | 1/2006 | Guttman et al. |
| 7,009,609 B2 | 3/2006 | Miyadai |
| 7,101,779 B2 | 9/2006 | Vaartstra et al. |
| 7,117,430 B2 | 10/2006 | Maguire, III et al. |
| 7,117,450 B1 | 10/2006 | Chaudhri |
| 7,266,763 B2 | 9/2007 | Peyton-Jones et al. |
| 7,275,207 B2 | 9/2007 | Aureglia et al. |
| 7,302,423 B2 * | 11/2007 | De Bellis ............ G06F 17/30392 345/663 |
| 7,451,397 B2 | 11/2008 | Weber et al. |
| 7,546,523 B2 | 6/2009 | Aureglia et al. |
| 7,707,486 B2 | 4/2010 | Genesereth et al. |
| 7,752,148 B2 | 7/2010 | Yu et al. |
| 7,765,227 B1 * | 7/2010 | Khoshnevisan .. G06F 17/30867 707/769 |
| 7,873,946 B2 | 1/2011 | Lathrop et al. |
| 8,130,205 B2 | 3/2012 | Forstall et al. |
| 8,234,293 B2 | 7/2012 | Martynov et al. |
| 8,280,722 B1 | 10/2012 | Harik et al. |
| 8,332,748 B1 | 12/2012 | Karam |
| 8,386,926 B1 | 2/2013 | Matsuoka |
| 8,412,749 B2 | 4/2013 | Fortuna et al. |
| 8,601,019 B1 | 12/2013 | Weininger et al. |
| 8,615,707 B2 | 12/2013 | Fortuna et al. |
| 8,645,825 B1 | 2/2014 | Cornea et al. |
| 9,223,770 B1 * | 12/2015 | Ledet ................ G06F 17/243 |
| 2002/0023105 A1 | 2/2002 | Wisniewski |
| 2002/0087568 A1 * | 7/2002 | LeDonne ............ G06F 17/3064 |
| 2002/0143809 A1 | 10/2002 | Bennett |
| 2002/0169799 A1 | 11/2002 | Voshell |
| 2002/0186252 A1 | 12/2002 | Himmel et al. |
| 2002/0194095 A1 | 12/2002 | Koren |
| 2003/0188257 A1 | 10/2003 | Aureglia et al. |
| 2003/0226105 A1 | 12/2003 | Waldau |
| 2004/0107277 A1 | 6/2004 | Levesque et al. |
| 2005/0091604 A1 | 4/2005 | Davis |
| 2005/0183017 A1 | 8/2005 | Cain |
| 2005/0210403 A1 | 9/2005 | Satanek |
| 2006/0036939 A1 | 2/2006 | Hobbs et al. |
| 2006/0070002 A1 | 3/2006 | Guido et al. |
| 2006/0074866 A1 | 4/2006 | Chamberlain et al. |
| 2006/0107226 A1 | 5/2006 | Matthews et al. |
| 2006/0117051 A1 | 6/2006 | Chin |
| 2006/0184901 A1 | 8/2006 | Dietz |
| 2006/0224946 A1 | 10/2006 | Barrett et al. |
| 2006/0288267 A1 | 12/2006 | DeSpain |
| 2007/0016872 A1 | 1/2007 | Cummins et al. |
| 2007/0083541 A1 | 4/2007 | Fraleigh et al. |
| 2007/0130503 A1 | 6/2007 | Voshell |
| 2007/0153897 A1 | 7/2007 | Yan |
| 2007/0185826 A1 * | 8/2007 | Brice ................ G06F 17/30306 |
| 2007/0220415 A1 * | 9/2007 | Cheng ................. G06F 17/246 715/212 |
| 2007/0234195 A1 | 10/2007 | Wells |
| 2007/0288433 A1 * | 12/2007 | Gupta .............. G06F 17/30663 |
| 2008/0028340 A1 | 1/2008 | Davis |
| 2008/0155464 A1 | 6/2008 | Jones et al. |
| 2008/0229184 A1 | 9/2008 | Prish et al. |
| 2008/0238938 A1 | 10/2008 | Eklund et al. |
| 2008/0294600 A1 * | 11/2008 | Clark ................ G06F 17/30091 |
| 2009/0158139 A1 | 6/2009 | Morris et al. |
| 2009/0187816 A1 | 7/2009 | Aureglia et al. |
| 2009/0287673 A1 | 11/2009 | Chronister |
| 2009/0325607 A1 | 12/2009 | Conway et al. |
| 2010/0185666 A1 * | 7/2010 | Crow .................. G06F 17/212 707/770 |
| 2011/0066933 A1 | 3/2011 | Ludwig |
| 2011/0148789 A1 | 6/2011 | Kim et al. |
| 2011/0179110 A1 | 7/2011 | Soloway |
| 2011/0283227 A1 | 11/2011 | Moore et al. |
| 2012/0022861 A1 * | 1/2012 | Imthurn ................ H03M 7/30 704/229 |
| 2013/0036346 A1 | 2/2013 | Cicerone |
| 2014/0372857 A1 * | 12/2014 | Otero .................. G06F 17/246 715/220 |
| 2015/0006502 A1 * | 1/2015 | Chang .............. G06F 17/30867 707/708 |

OTHER PUBLICATIONS

Actuarial Outpost, Discussion Forum "Excel: Conditional Tab Colors," http://www.actuarialoutpost.com/actuarial_discussion_forum/showthread.php?t=220776, 5 Pages, Jul. 2011.

Auto-Hide the Taskbar in Windows XP, Apr. 12, 2006, 3 pages, http://www.xp-tips.com/auto-hide-taskbar-.html.

Clark, iWork'09: The Missing Manual, O'Reilly Media, Inc., Apr. 24, 2009, Chapter 20, Using Formulas, 44 pages.

David Pogue, "iPhone: The Missing Manual, Forth Edition," 450 Pages, Aug. 2010.

Doing it Right: skipping the iPhone url bar, Aug. 5, 2010, 4 pages, http://remysharp.com/2010/08/05/doing-it-right-skipping-the-iphone-uri-bar.

Microsoft Excel 2003-2013, "Named Ranges in Excel" 5 pages.

Microsoft Excell 2003, "Creating Custom functions" 6 pages.

Pearson, "The Indirect Function", 1999, pp. 1-2.

Product Feature Tour, Visual Studio Style, Auto Hide Control Bars, Mar. 9, 2004, 2 pages, http://www.bcgsoft.com/featuretour/tour156.htm.

StackOverflow, "Are there such things as variables within an Excel formula?." 2009.

Teknomo, K. "How to use MS Excel Iterations", 2006, pp. 1-5.

Wayne Pan, "JavaScript Pull to Refresh," Jul. 2010, 3 pages.

* cited by examiner

400 ↘  410 ↓  420 ↓

|   | A | B | C |
|---|---|---|---|
| 1 | FIRST NAME | LAST NAME | ADDRESS |
| 2 | JOHN | | |
| 3 | | | |
| 4 | | | |
| 5 | | | |
| 6 | | | |

422 — JOHN SMITH / 10 MAIN STREET / FROM: CONTACTS

424 — JOHN BROWN / 500 MARKET STREET / FROM: ADDRESS LIST

|   | A | B | C |
|---|---|---|---|
| 1 | FIRST NAME | LAST NAME | ADDRESS |
| 2 | JOHN | BROWN | 500 MARKET STREET |
| 3 | | | |
| 4 | | | |
| 5 | | | |
| 6 | | | |

428 — SHOWING ENTRIES FROM ADDRESS LIST [ADD ALL]

426 — MARY LEE

426 — PATRICIA WILSON

42 — ROBERT TAYLOR

|   | A | B | C |
|---|---|---|---|
| 1 | FIRST NAME | LAST NAME | ADDRESS |
| 2 | JOHN | BROWN | 500 MARKET STREET |
| 3 | MARRY | LEE | 110 ELM STREET |
| 4 | PATRICIA | WILSON | 539 SECOND AVE |
| 5 | ROBERT | TAYLOR | 900 HILL STREET |
| 6 | MARIA | JONES | 540 HIGH STREET |

|   | A | B | C |
|---|---|---|---|
| 1 | SYMBOL | MARKET CAP | PRICE |
| 2 | XOM | | |
| 3 | GE | | |
| 4 | GOOG | *612* | |
| 5 | PG | | |
| 6 | WMT | | |

622 — GOOGLE INC. MARKET CAPITALIZATION 397.41 B USD

624 — GOOGLE INC. MARKET CAPITALIZATION 258.58 B EUR

*FIG. 6A*

|   | A | B | C |
|---|---|---|---|
| 1 | SYMBOL | MARKET CAP | PRICE |
| 2 | XOM | 405.51B | |
| 3 | GE | 254.04B | |
| 4 | GOOG | 397.41B | *612* |
| 5 | PG | 214.55B | |
| 6 | WMT | 242.18B | |

626 — GOOGLE INC. CURRENT SHARE PRICE: 1,182.16 USD

628 — GOOGLE INC. LAST CLOSING SHARE PRICE: 1,189.06 USD

*FIG. 6B*

|   | A | B | C |
|---|---|---|---|
| 1 | SYMBOL | MARKET CAP | PRICE |
| 2 | XOM | 405.51B | 93.64 |
| 3 | GE | 254.04B | 25.34 |
| 4 | GOOG | 397.41B | 1189.06 |
| 5 | PG | 214.55B | 79.19 |
| 6 | WMT | 242.18B | 74.93 |

POPULATING VALUES IN A SPREADSHEET USING SEMANTIC CUES

BACKGROUND

The disclosure herein relates generally to methods for populating values in a spreadsheet.

A spreadsheet or table allows a user to define a structure for information and populate cells with information according to that structure. A spreadsheet or table is typically divided into columns and rows. When structuring their data, the user typically attributes a meaning to each of the rows and/or columns. Sometimes, this meaning is reflected in a value for a header cell, such as a column header or a row header.

Often, the data being entered into a spreadsheet or table exists elsewhere, but in a form that prevents it from being directly copied, such as in a different structure or in an unstructured form. Auto-completion methods are known. However, applying auto-completion methods to a table is made difficult by the fact that the meanings attributed to the rows and/or columns by the user is not explicitly known.

SUMMARY

The disclosure relates to methods for populating values in a spreadsheet.

One aspect of the disclosed embodiments is a method that includes obtaining at least one query value from a table having a plurality of cells, executing a search function using the at least one query value to identify at least a first data set that is potentially relevant to the at least one query value, and outputting, for display, a first interface area that includes information from the first data set. In response to selection of the first interface area, the method includes populating a first cell from the plurality of cells with a first data value from the first data set.

Another aspect of the disclosed embodiments is a non-transitory computer-readable storage device including program instructions executable by one or more processors that, when executed, cause the one or more processors to perform operations. The operations include obtaining at least one query value from a table having a plurality of cells, executing a search function using the at least one query value to identify at least a first data set that is potentially relevant to the at least one query value, and outputting, for display, a first interface area that includes information from the first data set. The operations also include, in response to selection of the first interface area, populating a first cell from the plurality of cells with a first data value from the first data set.

Another aspect of the disclosed embodiments is an apparatus that includes one or more processors and one or more memory devices for storing program instructions used by the one or more processors. The program instructions, when executed by the one or more processors, cause the one or more processors to obtain at least one query value from a table having a plurality of cells, execute a search function using the at least one query value to identify at least a first data set that is potentially relevant to the at least one query value, and output, for display, a first interface area that includes information from the first data set. In response to selection of the first interface area, the instructions cause the one or more processors to populate a first cell from the plurality of cells with a first data value from the first data set.

BRIEF DESCRIPTION OF THE DRAWINGS

The description herein makes reference to the accompanying drawings wherein like reference numerals refer to like parts throughout the several views, and wherein:

FIG. 4A is an illustration showing display an interface screen according to a first example prior to a first user input;

FIG. 4B is an illustration showing display an interface screen according to the first example subsequent to the first user input and prior to a second user input;

FIG. 4C is an illustration showing display an interface screen according to the first example subsequent to the second user input;

FIG. 6A is an illustration showing display an interface screen according to a third example prior to a first user input;

FIG. 6B is an illustration showing display an interface screen according to the third example subsequent to the first user input and prior to a second user input;

FIG. 6C is an illustration showing display an interface screen subsequent to the second user input.

DETAILED DESCRIPTION

According to the methods, systems, apparatuses, and computer programs that are discussed herein, values in a table or spreadsheet can be populated automatically using semantic cues. Herein, the terms "spreadsheet" and "table" are used to refer broadly to structures for presenting information in which values can be arranged in rows and columns, and are used interchangeably. As will be explained in detail, values in a table or spreadsheet can be populated automatically by executing a search function using at least one query value that is derived from the table or spreadsheet to identify at least a first data set that is potentially relevant to the at least one query value. A first interface area is output for display, including information from the first data set. This allows the user to verify the relevance of the data set to a particular portion of the table or spreadsheet, such as a row or column. In response to verification of relevance by the user, such as by selection of the first interface area, one or more cells are populated with data values from the data set.

Figure 1:
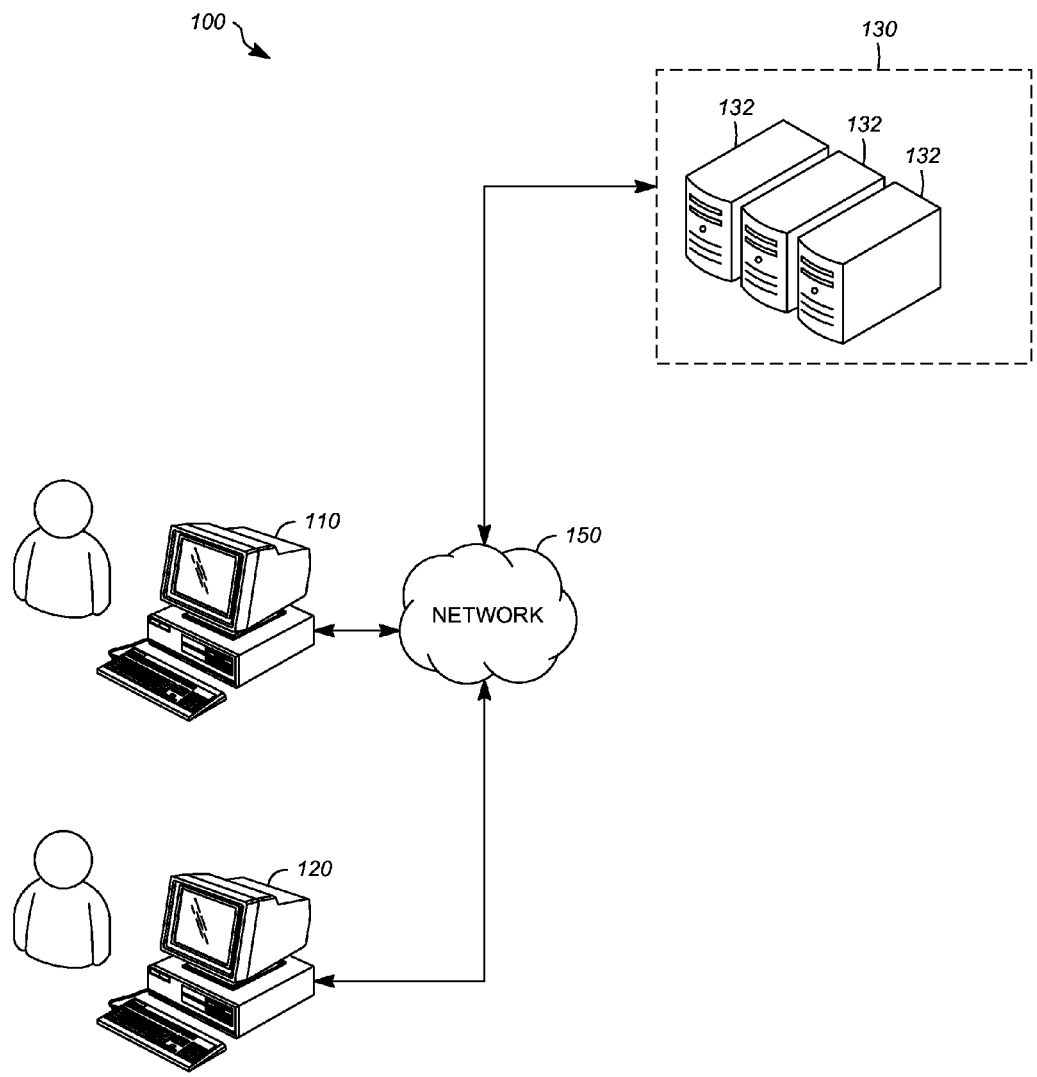
FIG. 1 is a block diagram showing an example of an environment in which a system for populating values in a spreadsheet can be implemented.

FIG. 1 shows an example of an environment 100 in which a system for populating values in a spreadsheet can be implemented. The environment 100 can include a user system 110, one or more additional user systems 120, and an application hosting service 130. The user system 110 and the additional user systems 120 are each representative of a large number (e.g. millions) of systems that can be included in the environment 100, with each system being able to utilize one or more applications that are provided by the application hosting service 130. The user system 110 and the additional user systems 120 can each be any manner of computer or computing device, such as a desktop computer, a laptop computer, a tablet computer, or a smart-phone (a computationally-enabled mobile telephone). The application hosting service 130 can be implemented using one or more server computers 132. The user system 110, the additional user systems 120, and the application hosting service 130 can each be implemented as a single system, multiple systems, distributed systems, or in any other form.

The systems, services, servers, and other computing devices described here are in communication via a network 150. The network 150 can be one or more communications networks of any suitable type in any combination, including wireless networks, wired networks, local area networks, wide area networks, cellular data networks, and the internet.

The application hosting service 130 can provide access to one or more hosted applications to a defined group of users including operators associated with the user system 110 and the additional user systems 120. One or more of the hosted applications can be operable to output, for display to a user, a document editing application that allows information to be arranged and displayed in a structured manner, such as a spreadsheet or a table. The document editing application can be output by the application hosting service 130 for display at a device associated with the user, such as the user system 110, by transmission of signals and/or data from the application hosting service to the user system 110 that, when interpreted by the user system 110, cause display of the document editing application at the user system 110.

Figure 2:
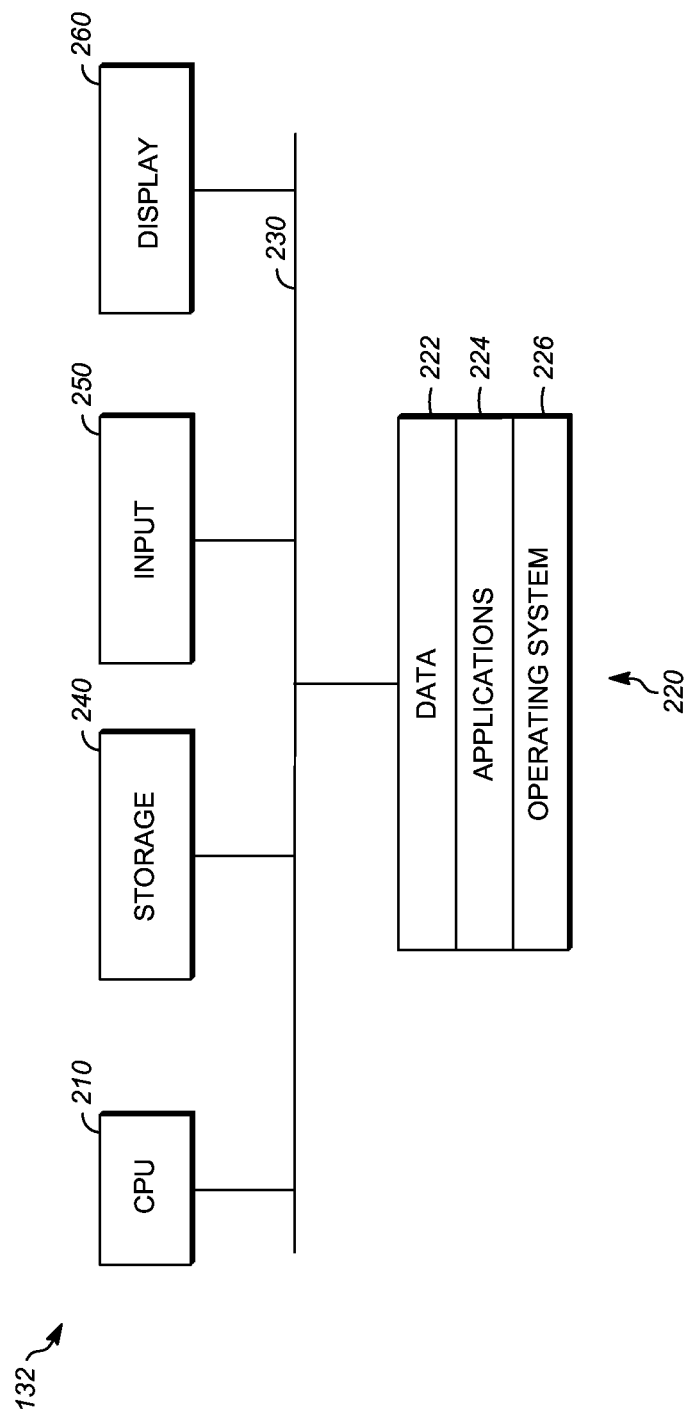
FIG. 2 is a block diagram showing an example of a hardware configuration for a server computer.

FIG. 2 is a block diagram of an example of a hardware configuration for the one or more server computers 132 of FIG. 1. The same hardware configuration or a similar hardware configuration can be used to implement the user system 110 and the additional user systems 120. Each server computer 132 can include a CPU 210. The CPU 210 can be a conventional central processing unit. Alternatively, the CPU 210 can be any other type of device, or multiple devices, capable of manipulating or processing information now-existing or hereafter developed. Although the disclosed examples can be practiced with a single processor as shown, e.g. CPU 210, advantages in speed and efficiency can be achieved using more than one processor.

Each server computer 132 can include memory 220, such as a random access memory device (RAM). Any other suitable type of storage device can also be used as the memory 220. The memory 220 can include code and data 222 that can be accessed by the CPU 210 using a bus 230. The memory 220 can further include one or more application programs 224 and an operating system 226. The application programs 224 can include software components in the form of computer executable program instructions that cause the CPU 210 to perform the operations and methods described here.

A storage device 240 can be optionally provided in the form of any suitable computer readable medium, such as a hard disc drive, a memory device, a flash drive, or an optical drive. One or more input devices 250, such as a keyboard, a mouse, or a gesture sensitive input device, receive user inputs and can output signals or data indicative of the user inputs to the CPU 210. One or more output devices can be provided, such as a display device 260. The display device 260, such as a liquid crystal display (LCD) or a cathode-ray tube (CRT), allows output to be presented to a user, for example, in response to receiving a video signal.

Although FIG. 2 depicts the CPU 210 and the memory 220 of each server computer 132 as being integrated into a single unit, other configurations can be utilized. The operations of the CPU 210 can be distributed across multiple machines (each machine having one or more of processors) which can be coupled directly or across a local area or other network. The memory 220 can be distributed across multiple machines such as network-based memory or memory in multiple machines. Although depicted here as a single bus, the bus 230 of each of each server computer 132 can be composed of multiple buses. Further, the storage device 240 can be directly coupled to the other components of the respective server computer 132 or can be accessed via a network and can comprise a single integrated unit such as a memory card or multiple units such as multiple memory cards. The one or more server computers can thus be implemented in a wide variety of configurations.

Figure 3:
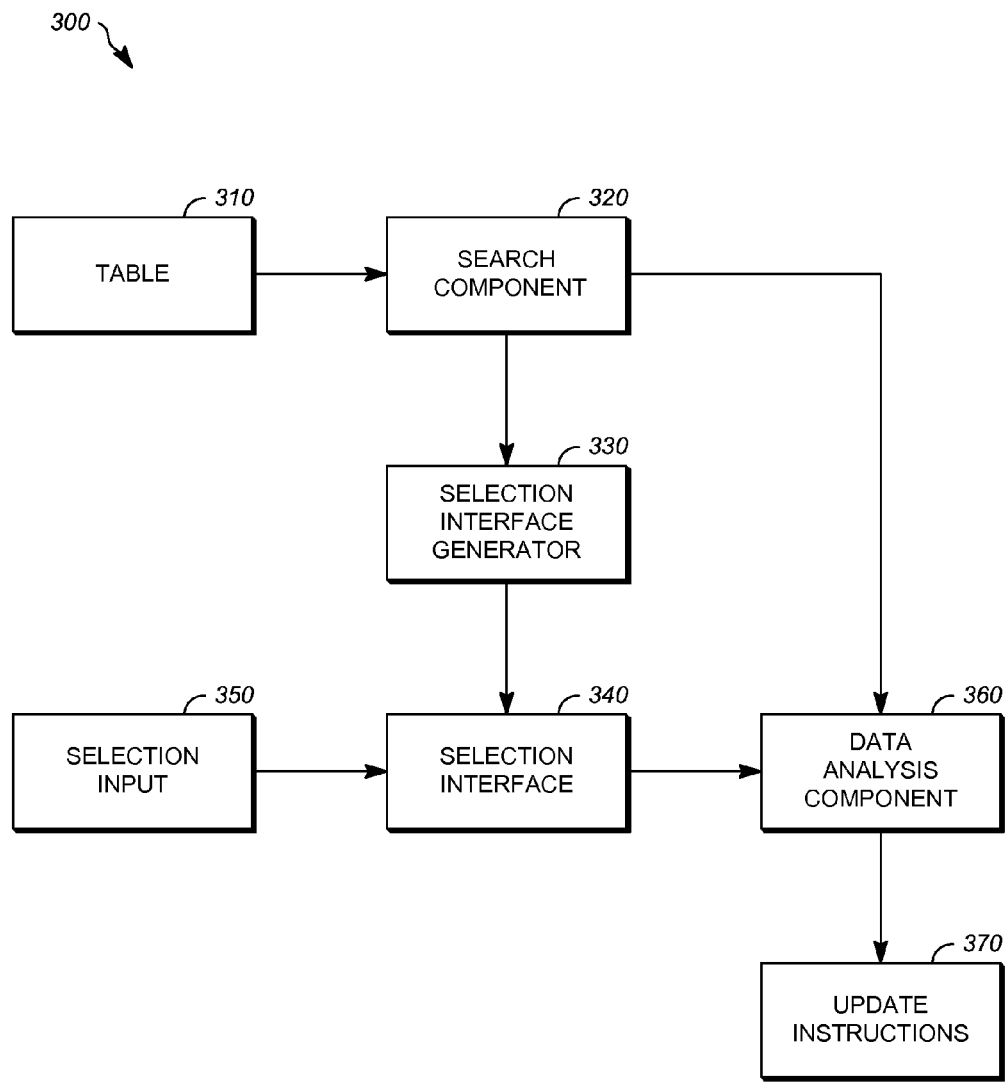
FIG. 3 is a block diagram showing a system for populating values in a spreadsheet.

FIG. 3 is a block diagram showing a system 300 for populating values in a spreadsheet. The system 300 can be, for example, part of the document editing application provided by the application hosting service 130. In such an implementation, the system 300 can be implemented at either or both of the application hosting service 130 and the user system 110.

A table 310 is provided to a search component 320 as an input. The table 310 can include a plurality of cells that are arranged in intersecting rows and columns. At least some of the cells have values coded in them. The table 310 can be arranged such that values that are coded in a particular row or column all have some manner of common meaning, such as falling in a common category of data (e.g. "name" or "address") or all being related to a certain thing or topic (e.g. a person, product, or company). The meaning of a particular row or column, however, is typically either not explicitly coded in the table 310, or is coded in the table 310 in a manner that is significant to user (e.g. a column heading or row heading) but is not known to the search component 320 with a high degree of confidence.

The search component 320 is operable to obtain one or more values from the table 310 for use as a query value. In some implementations, the search component 320 obtains a value from a single cell of the table 310 as the query value. As one example, the search component 320 can obtain a value that a user is currently entering or has recently entered as the query value. As another example, search component 320 can obtain a row header or a column header as a query value. As another example, the search component 320 can obtain a value from the same row or same column as a currently selected cell as a query value. As another example, the search component 320 can obtain a value from a cell that is adjacent (e.g. a cell in an adjacent row in the same column or a cell in the same column in an adjacent row) to the currently selected cell.

In other implementations, the search component 320 obtains multiple values for use as query values. In one example, the search component 320 can perform a search for information that is relevant to a single cell by obtaining a first query value from the row in which the cell is located, and obtaining a second query value from the column in which the cell is located. In another example, the search component 320 can perform a search for information relevant to a plurality of cells in a single row or column by obtaining a single value that is relevant to each of the cells in the plurality of cells. Thus, if a search is to be performed relative to five cells that are arranged in a column, with each cell being located in a different row, five query values can be obtained, each coming from a respective one of the five rows. In another example, when the search component 320 performs a search for information relevant to a plurality of cells that are located within a single row or column, the search component 320 can obtain at least one query value that is common to all of the cells and one or more additional query values that are specific to each of the cells. By way of example, where the plurality of cells includes five cells arranged in a column, a first query value can be obtained in the form of a column header that is common to all five of the cells, while additional query values can be obtained from a different column with each additional query value coming from a different row, with one of the additional query values coming from each row in which one of the five cells is located. As another example, the cell values themselves may also be query values. In this example, a column containing the values "Connecticut", "Nebraska" and "New Jersey" suggests a "U.S. states" query. The system may then suggest state names to insert. When the user inserts one, they've implicitly confirmed the query, and the full column completes. In this example, a column header or row header need not be utilized as a basis for determining the meaning of the values in the column or row. In another implementation, an entire table can be utilized as a query value, with information specific to a cell, row, or column being utilized to select a portion of the data identified as being relevant to the particular cell, row, or column.

The search component 320 is operable to generate search results that are relevant to the one or more query values that it obtains from the table 310. Any suitable searching algorithm now known or later developed can be utilized by the search component 320. In one example, the search component 320 can utilize a keyword-based search algorithm. In another example, the search component 320 can utilize a semantic search algorithm. The search component 320 can produce, as an output, a set of one or more search results. The search results can be, for example, one or more data values or one or more data sets. Furthermore, the search results can include multiple results and relevance rankings for each of the results.

The search performed by the search component 320 can be performed with respect to a corpus of documents. That is to say that the search component 320 uses the query values to identify relevant documents and portions of documents from the corpus and generates a relevancy score for each of those documents or document portions. The corpus of documents can be, for example, documents harvested from the internet. As another example, the corpus of documents can be or further include documents stored by the user such as at the user system 110 or at a network-connected storage service, such as a cloud storage service. In another example, the corpus of documents can be or include documents that are currently open (i.e. displayed) in applications or windows on a user's system, such as documents open in tabs of a web browser application with a tabbed interface. The corpus of documents can include either or both of structured documents and unstructured documents.

The search results and rankings that are generated by the search component 320 can be provided to a selection interface generator 330. The selection interface generator 330 is operable to output information that, when rendered by the user system 110, causes a user interface or a portion of a user interface to be output for display at the user system 110. In particular, the selection interface generator 330 can cause a selection interface 340 including information generated by the search component 320 to be output for display.

The information incorporated in the selection interface 340 can include information from one or more of the search results that were identified by the search component 320. If multiple search results are represented by the selection interface 340, those search results can be displayed in a manner that reflects their relevancy or ranking scores, as determined by the search component 320. For example, if two search results are identified by the search component 320, the results can be displayed in a top-to-bottom order with the highest rank result position at the top of the list of results.

The selection interface generator 330 can generate the selection interface 340 such that it includes interface portions representing one or more of the search results that were identified by the search component 320. Some or all of the interface portions of the selection interface 340 can be operable to receive a selection input 350. The selection input 350 is a signal representing user selection of an interface portion from the selection interface 340 that corresponds to one of the search results from the search component 320. One example of a selection input is a click or tap on a portion of the selection interface 340. Another example of a selection input is a drag-and-drop operation performed with respect to at least a portion of the selection interface. For instance, one or more data values could be dragged-and-dropped from the selection interface 340 to a cell in the table, and this action can be used as the selection input 350. Other actions taken by the user can be used as the selection input 350, to the extent that those actions provide a basis for inferring that the user has indicated that the information contained in a particular portion of the selection interface is relevant to the table.

A data analysis component 360 receives the search results from the search component 320 and also receives the selection input 350 by way of the selection interface 340. The data analysis component utilizes the selection input 350 as a semantic cue that represents the meaning that the user attributes to a portion of the table 310.

When the search component 320 outputs multiple search results that each has some relevance to a particular column in the table 310, the search component 320 is, essentially, identifying those results based on a probability that they are relevant to a portion of the table 310. Since this is a probability, it does not represent knowledge on the part of the search component 320 as to the user's intended meaning of any portion of the table 310. When, however, the user selects one of the search results by way of the selection input 350, the user has then provided the data analysis component 360 with additional data by which to understand at least a portion of the table 310. In particular, the data analysis component 360 now understands that a particular search result, such as a data value or a data set, is in fact, relevant to a portion of the table 310.

In a simple example, the search component 320 has conducted a search based on a query value or multiple query values that are relevant to a single cell. Based on the selection input 350, the data analysis component 360 identifies a value returned as a search result by the search component 320 and causes the table 310 to be updated to include that value by generating update instructions 370. The selection input 350 can, however, represent user validation as to the meaning of a group of cells, even if the selection input only explicitly selects a value for a single cell. Thus, when the user acknowledges the relevance of a value for a single cell by the selection input 350, the meaning of adjacent cells, such as cells in a common row or a common column, can be inferred by the data analysis component 360. This is because the data analysis component is now able to analyze the known relevant data set, as selected by the user, for relevance with respect to the other cells. Thus, the data analysis component 360, based on the selection input 350, can generate the update instructions 370 such that they cause values from a data set identified by the search component 320 to be populated within each of a plurality of cells in the table 310. The specific value that is selected for updating a particular cell can be based on query values from the table 310 that are relevant to that particular cell, but may not be relevant to other cells from the portion of the table 310 that is being analyzed. For example, where a data set is determined to be relevant by the search component 320 based on a column header and a plurality of values from an adjacent column each corresponding to a particular cell in the plurality of cells, the value selected for a particular cell can be selected from the data set based on the value that appears in the different column within the same row as the cell being analyzed. The same analysis could be applied on the basis of a row header and values appearing in a plurality of columns from a different row. Other modes of analysis can be employed by the data analysis component to populate the table 310 via the update instructions 370, as will be better understood with reference to the examples described herein.

FIGS. 4A-4C are illustrations showing display of an interface screen 400 according to a first example. The interface screen 400 can be output for display as described with respect to the system 300. The interface screen 400 includes a table area 410 and a selection area 420. The table area 410 includes a plurality of cells arranged in rows and columns. In the illustrated example, the table area 410 includes columns A through C and rows 1 through 6. Row 1 is a header row, with Cell A1 having a value of "First Name," Cell B1 having a value of "Last Name," and Cell C1 having a value of "Address."

The selection area 420 is the portion of the interface screen 400 in which information generated by the selection interface generator 330 is output for display, namely, the selection interface 340. In one implementation, the selection area 420 occupies a fixed, unchanging area of the interface screen 400, the selection area 420 is separate from the table area 410, and the selection area 420 can remain in a fixed position without changing position based on, for example, selection of a particular cell. Thus, the selection area 420 can be at a location that is separate from and spaced from a portion of the table area 410 that is being analyzed by the search component 320 and/or the data analysis component 360 of the system 300. In other implementations, the selection area 420 is not separate from the table area, but instead, the selection area 420 can be superimposed over the table area 410. In these implementations, the position of the selection area can be fixed or dynamic. An example of a fixed position for the selection area 420 is adjacent to an edge of the table area 410 or an edge of the interface screen 400. In one implementation, the selection area 420 includes one or more interface elements that are superimposed over a portion of the interface screen 400, are positioned partially off of the interface screen 400, and move fully into view in response to a user input, such as a mouseover or a single tap on a gesture sensitive input device. An example of a dynamic position for the selection area 420 is superimposition over the table area 410 adjacent to a currently selected cell of the table area 410 or adjacent to a portion of the table area 410 to which the information contained in the selection area 420 pertains.

FIG. 4A represents a point in time immediately subsequent to the user entering the value "John" in Cell A2, within Column A, which has the value of "First Name" in its header cell A1. Based on entry of the value "John" in Cell A2, the search component 320 can attempt to identify information that is relevant to other cells in the table 310 that is shown within the table area 410 of the interface screen 400. In this example, the search component 320 has utilized at least one query value from the table area 410, namely, the value "John" in Cell A2 as the basis for a search and has identified search results that are relevant to this query value. The search component 320 could also utilize the column header values in Row 1 as query values to search for relevant information. In such an implementation, the search component 320 could search for data sets that include structured data relevant to the descriptors "First Name," "Last Name," and "Address" that also include the value "John" as a data value within the structure.

Here, the search component 320 has identified two data sets as being potentially relevant to at least a portion of the table 310 that is displayed within the table area 410. A first interface portion such as a first knowledge card 422 is displayed in the selection area 420. As used herein, the term "knowledge card" refers to a discrete portion of a user interface in which specified information is displayed. The first knowledge card 422 includes information from a data set that is identified as "Contacts." The Contacts data set has been identified as relevant by the search component 320 and has been ranked highest among the results returned by the search component 320. The data analysis component 360 has identified specific values within that data set as relevant to Row 2 based on inclusion of the value "John" in Cell A2. In particular, the data analysis component 360 has identified an entry in the Contacts data set that refers to an individual named John Smith having an address at 10 Main Street.

The search component 320 has also identified a second data set, which is reflected in a second interface area within the selection area 420, referred to herein as a second knowledge card 424. The second knowledge card 424 includes information from a second data set that is identified as "Address List," which was identified by the search component 320 as being relevant to the table that is displayed within the table area 410. The data analysis component 360 has selected data values from that data set as being potentially relevant to Row 2, namely an entry regarding an individual named John Brown having an address at 500 Market Street.

With the first knowledge card 422 and the second knowledge card 424 being output for display to the user, the selection area 420 is operable to receive a user selection of one of the first knowledge card 422 or the second knowledge card 424. This selection can be in the form of, for example, the user clicking on one of the first knowledge card 422 or the second knowledge card 424. Thus, after entering the value "John" in Cell A2, the user is then presented with the first knowledge card 422 and the second knowledge card 424. In this example, the user selects the second knowledge card 424 by an input such as a mouse click or a tap on a gesture-sensitive input device.

In response to receiving the user selection of the second knowledge card 424, the data analysis component 360 generates the update instructions 370 to include information from the first knowledge card 422 within Row 2 of the table area 410, as shown in FIG. 4B. Based on the user selection of the second knowledge card 424, the data analysis component 360 has now received a semantic cue indicating that the data set identified as "Address List" may be relevant to the table that is being created by the user in the table area 410. Thus, responsive to the first user input selecting the second knowledge card 424, additional information can be populated in the table area 410. In another implementation, instead of populating date in Column B and Column C in response to selection of the second knowledge card 424, data from the second knowledge card can be assigned by user input to a specific location in the table area 410. As one example, the address shown in the second knowledge card 424 could be dragged-and-dropped by the user to Cell C2, and this would indicate both that "Address List" is relevant and that a particular data type from "Address List" corresponds to Column C. In another example, selecting the second knowledge card 424 could cause more information from the "John Brown" entry in the "Address List" data set to be displayed in the selection area 420. This would allow the user to drill down into a specific data set, and then explicitly correlate specific parts of the data set to specific parts of the table area 410. The ability to drill down into a data set could be combined with automatic population of all values in a row, such as by allowing the user to correct mistakes or by allowing the user to explicitly correlate the data to the table area when the meaning of a part of a table cannot be determined by the system.

In one implementation, additional data can be selected by the data analysis component 360 without further user intervention and automatically populated in the table area 410, such as in Rows 3-6, by selecting other persons identified in the Address List and entering their first name, last name, and address in the appropriate cells. In the illustrated implementation, however, the selection interface generator 330 can update the selection interface 340 based on the selection input 350 to reflect the fact that the data set represented by the second knowledge card 424 has been indicated by the user as being relevant to the table shown in the table area 410 via the selection input 350. Thus, in the illustrated example, the selection area 420 has been updated to include information from the Address List data set. In some implementations, the selection area 420 can also include a message indicating that it is showing entries from the Address List data set. Each interface portion 426 includes information from the Address List data set, such as the names of persons identified in the Address List data set. The user input selecting one of the interface portions 426 is operable to add information from the Address List and corresponding to the identified person to the table shown in the table area 410. The selection area 420 in this example also includes an interface button 428 titled "Add All" that can be operated by the user in order to add information to the table for all of the entries in the Address List data set.

FIG. 4C shows the interface screen 400 subsequent to receiving a second user input in the form of operation of the interface button 428, as shown in FIG. 4B. Subsequent to the second user input, the table area 410 is updated to include four additional entries appearing in Rows 3-6, respectively, each having been updated to include a value in each of Row A, Row B, and Row C.

Figure 5A:
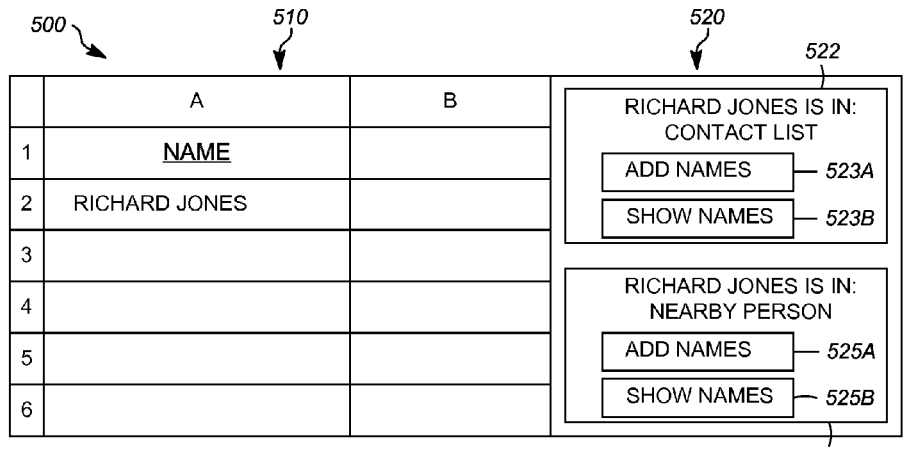
FIG. 5A is an illustration showing display an interface screen according to a second example prior to a first user input.
Figure 5B:
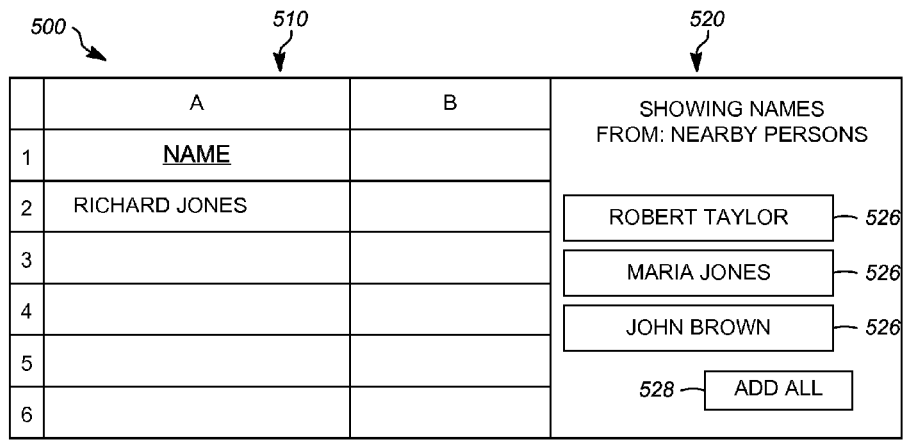
FIG. 5B is an illustration showing display an interface screen according to the second example subsequent to the first user input and prior to a second user input.
Figure 5C:
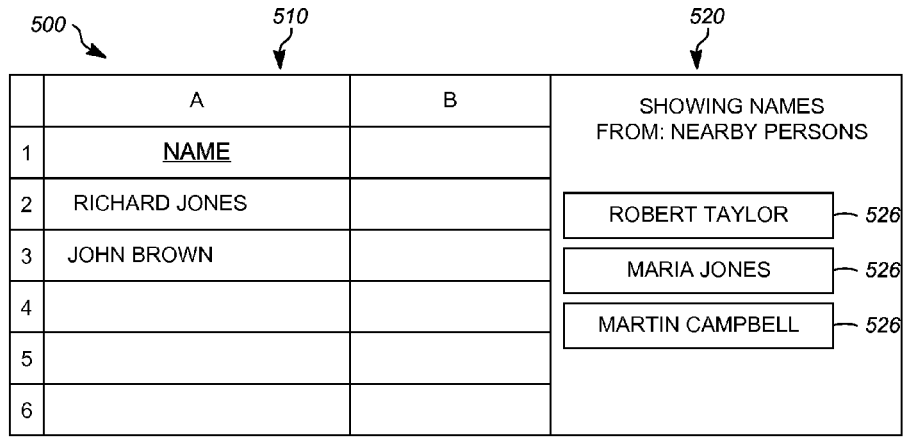
FIG. 5C is an illustration showing display an interface screen according to the second example subsequent to the second user input.

FIGS. 5A-5C show an interface screen 500 according to a second example. The interface screen 500 includes a table area 510 and a selection area 520. As shown in FIG. 5A, initially, the table in the table area 510 includes a header cell A1 with the value "Name." The value "Richard Jones" has been entered in Cell A2. Thus, header cell A1 is a column header for the column defined by cells A2-A6. The search component 320 has received at least one value from the table area 510 as a query value, such as the value of Cell A2, or, alternatively, the values of both Cells A1 and A2. In the selection area 520, a first knowledge card 522 has been output for display. The first knowledge card 522 indicates that the value "Richard Jones" has been found in the data set identified as "Contact List." Two interface portions of the first knowledge card 522 are configured to receive user inputs indicating selection of the data set represented by the first knowledge card 522, namely an "Add Names" button 523A and a "Show Names" button 523B. The "Show Names" button can cause the names included in the "Contact List" data set to be output for display before they are added to the table area 510. In some implementations, the "Show Names: button is eliminated, and the names can be shown by a user input that selects another portion of the interface, such as the text "Contact List", or the names can be shown by default without user input. A second knowledge card 524 indicates that "Richard Jones" is found in the data set identified as "Nearby Persons." By way of example, the "Nearby Persons" data set can include data values representing persons who are known to be in the geographical proximity of the user system 110 based on, for example, geo-location signals received from computing devices associated with each of the persons identified in the "Nearby Persons" data set. Two interface portions of the second knowledge card 524 can be operable to receive user inputs selecting the "Nearby Persons" data set, namely, an "Add Names" button 525A and a "Show Names" button 525B.

FIG. 5B shows the interface screen 500 subsequent to receiving a user input signal representing operation of the "Show Names" button 525B of the second knowledge card 524. This causes the selection area 520 to be updated to indicate that it is showing names from the data set identified as "Nearby Persons" and including a plurality of interface buttons 526 each associated with a respective record in the "Nearby Persons" data set and an "Add All" button 528. Operation of any of the interface buttons 526 will cause information reflected in that button to be added to the table area 510 from the "Nearby Persons" data set. Operation of the "Add All" button 528 will cause information from all of the records contained in the "Nearby Persons" data set to be added to the table area 510. This is the same action that could have been taken without first showing the names if the user had instead operated the "Add Names" button 525A of FIG. 5A. FIG. 5C shows the interface screen 500 subsequent to receiving a second user input signal representing operation by the user of one of the interface buttons 526, with the value "John Brown" having been populated in Cell A3 of the table area 510 as a result. The data values reflected in the interface buttons 526 of the selection area 520 have also been updated.

FIGS. 6A-6C show an interface screen 600 according to a third example. The interface screen 600 includes a table area 610 and a selection area 620. The table area 610 includes Columns A-C having column headers in Row 1. The column headers have the value "Symbol" in Cell A1, the value "Market Cap" in Cell B1, and the value "Price" in Cell C1. Initially, Column A is populated with values corresponding to stock ticker symbols in Cells A2-A6. Cell B4 is currently selected by the user, as indicated by a selection indicator 612. Adjacent to Cell B4, Cell A4 in the "Symbol" column has the value "GOOG." Based on one or more query values from the table area 610, the search component 320 has identified a plurality of data sets as being potentially relevant to the table. For example, the search component 320 can identify data sets that are potentially relevant to Cell B4, which is currently selected. Based on the column header value "Market Cap" in Cell B1 as well as one or more of the values contained in Cells A2-A6.

In the selection area 620, a first knowledge card 622 and a second knowledge card 624 are output for display. The first knowledge card 622 represents a first data set that has been identified by the search component 320, where the first data set relates to the market capitalization values of publicly-held companies expressed in United States Dollars. The first knowledge card 622 also displays a value from that data set, which is the current market capitalization of the company Google Inc. expressed in United States Dollars, where this value was selected based on its relevance to the value in Cell A4, which is in the same row as the currently selected Cell B4 and is directly adjacent to the currently selected Cell B4. The second knowledge card 624 shows information from a second data set that was identified by the search component 320, the information in the second data set including the market capitalization of publicly-held companies expressed in Euros. The second knowledge card 624 displays the market capitalization of the company Google Inc. expressed in Euros.

In response to a first user input signal representing selection of the first knowledge card 622, the data analysis component 360 identifies column B as relating to data representing the current market capitalization of publicly-held companies expressed in United States Dollars. Based on this information, the table area 610 is populated without using Cells B2-B6. Each of these values is selected from the data set identified by the first user signal and further based on the values in Column A for the corresponding row of each cell in Column B. Thus, the value of Cell B2 is selected from the data set identified by the first user symbol and further based on relevance to the symbol "XOM" that appears in Cell A2. In FIG. 6B, the user has selected Cell C4, and the selection indicator 612 indicates that Cell C4 is now selected. The search component 320 conducts a further search to identify a data set that is relevant to Cell C4. A third knowledge card 626 and a fourth knowledge card 628 are output for display in the selection area 620. The third knowledge card 626 represents a data set containing the current share price for publicly-held companies and displays values pertaining to company "Google Inc.," which was identified as relevant based on the value of Cell A4. The fourth knowledge card 628 represents a data set containing information as to the previous day's closing share price for publicly-traded companies and includes data values that were selected as representative of the company "Google Inc." based on the value of Cell A4.

In FIG. 6C, responsive to user selection of the fourth knowledge card 628 of FIG. 6B, Column C has been populated with values in Cells C2-C6 from the data set represented by the fourth knowledge card 628, where the particular values for each cell were selected based on query values found in a common row for each cell, namely, values present in Column A. Thus, values shown in Cell C2 were selected from the data set identified by the fourth knowledge card 628 based on the presence of the value "XOM" in Cell A2.

Figure 7:
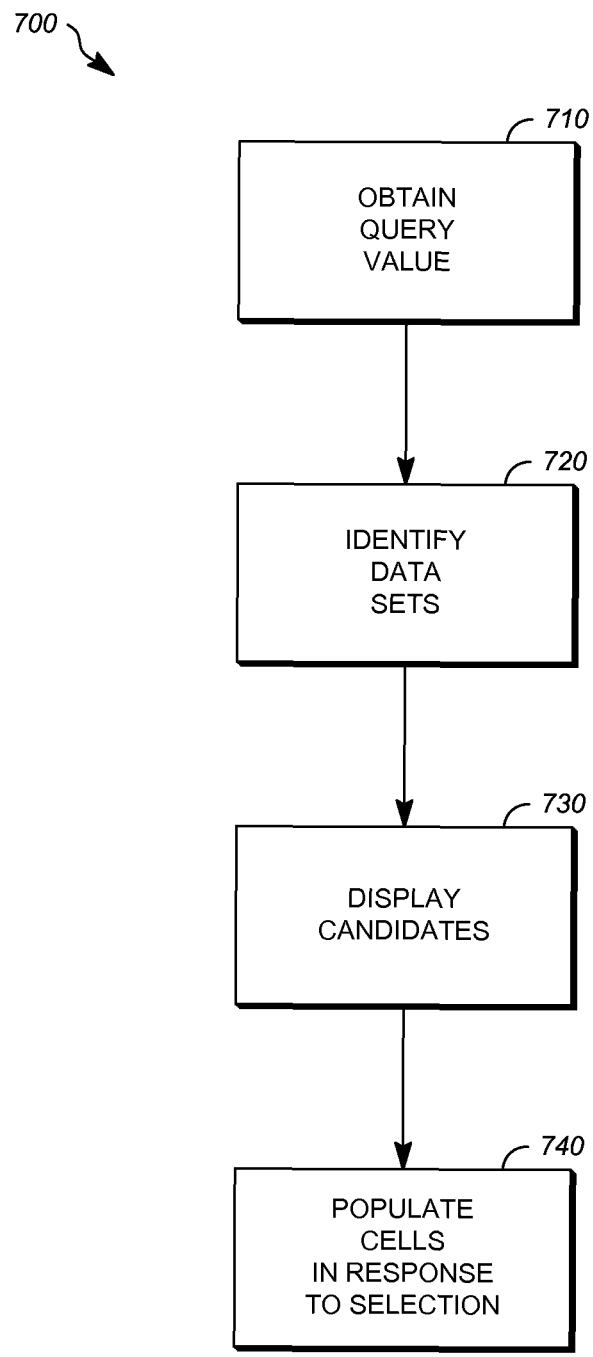
FIG. 7 is a flowchart showing a first example of a process for populating values in a spreadsheet.

FIG. 7 is a flowchart showing a first example of a process for populating values in a spreadsheet. The operations described in connection with the process 700 can be performed at one or more computers, such as at the one or more server computers 132 of the application hosting service 130. When an operation is described as being performed by one or more computers, it is completed when it is performed by one computer working alone, or by multiple computers working together. The operations described in connection with the process 700 can be embodied as a non-transitory computer readable storage medium including program instructions executable by one or more processors that, when executed, cause the one or more processors to perform the operations. For example, the operations described in connection with the process 700 could be stored at the memory 220 of one of the server computers 132 and be executable by the CPU 210 thereof.

Initially, in operation 710, at least one query value is obtained from a table that has a plurality of cells. This can be performed as explained with respect to obtaining query values from the table 310 by the search component 320.

In operation 720, one or more data sets are identified based on the query values obtained from the table in operation 710. This can be performed, for example, as described with respect to the search component 320. For example, identifying one or more data sets can be performed by executing a search function using the at least one query value as an input to identify at least a first data set that is potentially relevant to the at least one query value. In some implementations, the search function is further executed using the at least one query value to identify at least a second data set that is potentially relevant to the at least one query value. Any desired number of data sets can be identified at operation 720. In addition, relevance or ranking scores can be generated for each of the data sets at operation 720.

In operation 730, candidate data sets are output for display. The candidate data sets can be the data sets that were identified at operation 720. In some implementations, the candidate data sets that are output for display at operation 730 are a subset including one or more, but less than all of the data sets that were identified at operation 720. Operation 730 can include outputting, for display, a first interface area that includes information from the first data set. This can be performed, for example, as described with respect to the selection interface generator 330 in the selection interface 340, and as further described with respect to the selection area 420 of FIGS. 4A-4C, the selection area 520 of FIGS. 5A-5C, and the selection area 620 of FIGS. 6A-6C. In some implementations, the information from the first data set that is included in the first interface area can be information from the first data set that is selected based on a second query value that is associated with the first cell. For example, the second query value can be obtained from a second cell that is adjacent to the first cell. The second query value can be obtained from a second cell that is in a common row or column as compared to the first cell, or the second query value can be at least one of a column header or a row header that corresponds to the first cell. Other examples are possible.

At operation 740, in response to selection of one of the data sets that were displayed as candidates at operation 730, one or more cells from the table are populated with values from the selected data set. In one example, in response to selection of a first interface area representing one of the candidates that was output for display at operation 730, a first cell from the plurality of cells is populated from a first data value from the first data set. In some implementations, where multiple interface areas each corresponding to a respective candidate data set or output for display at operation 730, selection of a second interface area representing a second data set subsequent to its display at operation 730 will cause the first cell from the plurality of cells to be populated with the data value from the second data set at operation 740. In addition to populating the first cell from the plurality of cells with a value from the selected data set at operation 740, additional cells can also be populated with information at operation 740. For example, where selection of one of the candidate data sets at operation 730 indicates a meaning for a column and/or row, data values from that data set can be applied to cells other than the first cell based on this information, and, in some implementations, further based on additional query values found in the table, as described, for example, with respect to the interface screen 600 of FIGS. 6A-6C.

The foregoing description describes only some exemplary implementations of the described techniques. Other implementations are available. For example, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

The implementations of the computer devices (e.g., clients and servers) described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of each of the clients and each of the servers described herein do not necessarily have to be implemented in the same manner.

Operations that are described as being performed by a single processor, computer, or device can be distributed across a number of different processors, computers or devices. Similarly, operations that are described as being performed by different processors, computers, or devices can, in some cases, be performed by a single processor, computer or device.

Although features may be described above or claimed as acting in certain combinations, one or more features of a combination can in some cases be excised from the combination, and the combination may be directed to a sub-combination or variation of a sub-combination.

The systems described herein, such as client computers and server computers, can be implemented using general purpose computers/processors with a computer program that, when executed, carries out any of the respective methods, algorithms and/or instructions described herein. In addition or alternatively, for example, special purpose computers/processors can be utilized which can contain specialized hardware for carrying out any of the methods, algorithms, or instructions described herein.

Some portions of above description include disclosure presented in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality. It should be noted that the process steps and instructions of implementations of this disclosure could be embodied in software, firmware or hardware, and when embodied in software, could be downloaded to reside on and be operated from different platforms used by real time network operating systems.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

At least one implementation of this disclosure relates to an apparatus for performing the operations herein. This apparatus may be specially constructed for the required purposes, or it may comprise a general-purpose computer selectively activated or reconfigured by a computer program stored on a computer readable storage medium that can be accessed by the computer.

All or a portion of the embodiments of the disclosure can take the form of a computer program product accessible from, for example, a non-transitory computer-usable or computer-readable medium. The computer program, when executed, can carry out any of the respective techniques, algorithms and/or instructions described herein. A non-transitory computer-usable or computer-readable medium can be any device that can, for example, tangibly contain, store, communicate, or transport the program for use by or in connection with any processor. The non-transitory medium can be, for example, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for tangibly containing, storing, communicating, or transporting electronic instructions.

It is to be understood that the disclosure is not to be limited to the disclosed embodiments but, on the contrary, is intended to cover various modifications and equivalent arrangements included within the spirit and scope of the appended claims.

What is claimed is:
1. A method, comprising:
   obtaining a first query value from a table having a plurality of cells and a second query value from the plurality of cells, wherein the first query value is relevant to each of the plurality of cells and the second query value is relevant to a respective one of the plurality of cells;

executing a search function using the first and second query values to identify a first document that includes a first data set that is potentially relevant to the first and second query values and a second document that includes a second data set that is potentially relevant to the first and second query values, wherein the second data set is different than the first data set;

determining a relevancy score for the first data set and determining a relevancy score for the second data set;

outputting, for display, an interface area that includes information that identifies the first data set and information that identifies the second data set, wherein the information that identifies the first data set and the information that identifies the second data set are displayed according to the relevancy score of the first data set and the relevancy score of the second data set;

receiving a selection input that identifies one of the first data set or the second data set as a selected data set; and populating a first cell from the plurality of cells with a first data value from the selected data set.

2. The method of claim 1, wherein the first data value is displayed in the interface area as part of the information that identifies the first data set.

3. The method of claim 1, wherein one of the first and second query values is obtained from a second cell, wherein the first cell and the second cell are each disposed in one of a common row or a common column.

4. The method of claim 1, wherein one of the first and second query values is at least one of a column header or a row header that corresponds to the first cell.

5. The method of claim 1, wherein the interface area is separate from the first cell.

6. The method of claim 1, wherein the interface area is spaced apart from the first cell.

7. The method of claim 1, wherein the first data value is selected from the selected data set based on a second query value from the table.

8. The method of claim 1, wherein the information from the selected data set is selected based on a second query value is associated with the first cell from the plurality of cells.

9. The method of claim 8, wherein the second query value is obtained from a second cell that is adjacent to the first cell.

10. The method of claim 8, wherein the second query value is at least one of a column header or a row header that corresponds to the first cell.

11. The method of claim 1, further comprising:
populating a second cell from the plurality of cells with a second data value from the selected data set.

12. The method of claim 11, wherein the first data value is selected from the selected data set based on a second query value from the table, and the second data value is selected from the selected data set based on a third query value from the table.

13. A non-transitory computer-readable storage device including program instructions executable by one or more processors that, when executed, cause the one or more processors to perform operations, the operations comprising:
obtaining a first query value from a table having a plurality of cells and a second query value from the plurality of cells, wherein the first query value is relevant to each of the plurality of cells and the second query value is relevant to a respective one of the plurality of cells;

executing a search function using the first and second query values to identify a first document that includes a first data set that is potentially relevant to the first and second query values and a second document that includes a second data set that is potentially relevant to the first and second query values, wherein the second data set is different than the first data set;

determining a relevancy score for the first data set and determining a relevancy score for the second data set;

outputting, for display, an interface area that includes information that identifies the first data set and information that identifies the second data set, wherein the information that identifies the first data set and the information that identifies the second data set are displayed according to the relevancy score of the first data set and the relevancy score of the second data set;

receiving a selection input that identifies one of the first data set or the second data set as a selected data set; and populating a first cell from the plurality of cells with a first data value from the selected data set.

14. The non-transitory computer-readable storage device of claim 13, wherein the first data value is displayed in the interface area as part of the information that identifies the selected data set.

15. The non-transitory computer-readable storage device of claim 13, wherein one of the first and second query values is obtained from a second cell, wherein the first cell and the second cell are each disposed in one of a common row or a common column.

16. An apparatus, comprising:
one or more processors; and
one or more memory devices for storing program instructions used by the one or more processors, wherein the program instructions, when executed by the one or more processors, cause the one or more processors to:
obtain a first query value from a table having a plurality of cells and a second query value from the plurality of cells, wherein the first query value is relevant to each of the plurality of cells and the second query value is relevant to a respective one of the plurality of cells;

execute a search function using the first and second query values to identify a first document that includes a first data set that is potentially relevant to the first and second query values and a second document that includes a second data set that is potentially relevant to the first and second query values, wherein the second data set is different than the first data set;

determine a relevancy score for the first data set and determine a relevancy score for the second data set;

output, for display, an interface area that includes information that identifies first data set and information that identifies the second data set, wherein the information that identifies the first data set and the information that identifies the second data set are displayed according to the relevancy score of the first data set and the relevancy score of the second data set;

receive a selection input that identifies one of the first data set or the second data set as a selected data set; and populate a first cell from the plurality of cells with a first data value from the selected data set.

17. The apparatus of claim 16, wherein the first data value is displayed in the interface area as part of the information from the selected data set.

18. The apparatus of claim 16, wherein one of the first and second query values is obtained from a second cell, wherein the first cell and the second cell are each disposed in one of a common row or a common column.

\* \* \* \* \*